United States Patent
Funck (10) Patent No.: US 11,237,034 B2
(45) Date of Patent: Feb. 1, 2022

(54) DEVICE AND METHOD FOR ULTRASONIC FLOW MEASUREMENT

(71) Applicant: FLEXIM FLEXIBLE INDUSTRIEMESSTECHNIK GMBH, Berlin (DE)

(72) Inventor: Bernhard Funck, Rostock (DE)

(73) Assignee: FLEXIM FLEXIBLE INDUSTRIEMESSTECHNIK GMBH, Berlin (DE)

( * ) Notice: Subject to any disclaimer, the term of this patent is extended or adjusted under 35 U.S.C. 154(b) by 183 days.

(21) Appl. No.: 16/725,696

(22) Filed: Dec. 23, 2019

(65) Prior Publication Data

US 2020/0173824 A1 Jun. 4, 2020

Related U.S. Application Data

(63) Continuation of application No. PCT/EP2018/063922, filed on May 28, 2018.

(30) Foreign Application Priority Data

Jun. 23, 2017 (EP) ..................................... 17177639

(51) Int. Cl.
 *G01F 1/66* (2006.01)
 *G01F 25/00* (2006.01)
 (Continued)

(52) U.S. Cl.
 CPC .............. *G01F 1/662* (2013.01); *G01F 1/667* (2013.01); *G01F 25/0007* (2013.01);
 (Continued)

(58) Field of Classification Search
 CPC . G01F 1/66; G01F 1/662; G01F 1/667; G01F 25/0007; G01N 29/222; G01N 29/223; G01N 29/02; G01N 29/221
 See application file for complete search history.

(56) References Cited

U.S. PATENT DOCUMENTS

| 5,987,997 A | 11/1999 | Roskam et al. |
|---|---|---|
| 6,494,105 B1 | 12/2002 | Gallagher |

(Continued)

FOREIGN PATENT DOCUMENTS

| DE | 19808642 C1 | 8/1999 |
|---|---|---|
| DE | 102008055164 A1 | 11/2014 |

(Continued)

OTHER PUBLICATIONS

International Search Report dated Aug. 30, 2018 in corresponding application PCT/EP2018/063922.

*Primary Examiner* — Benjamin R Schmitt
(74) *Attorney, Agent, or Firm* — Muncy, Geissler, Olds & Lowe, P.C.

(57) ABSTRACT

A method and an arrangement for ultrasonic flow measurement according to the transit-time method is provided for accurate and non-invasive flow measurement independent of the viscosity. At least one sound transducer pair is provided that has a clamp-on ultrasonic transducer operating in transmitting operation and a clamp-on ultrasonic transducer operating in receiving operation. The cross-section of a measurement tube through which a gaseous or liquid medium flows is substantially a pentagon having a base side and having sides adjacent at right angles and having sides adjacent thereto and lying opposite the base side, which include an angle of less than 180°. The sound transducer pair is arranged on the base side in order produce first sound paths. Because of flattening of the vertex lying opposite the base side, the same sound transducer pair additionally produces a second sound path.

7 Claims, 5 Drawing Sheets

(51) Int. Cl.
*G01N 29/22* (2006.01)
*G01N 29/02* (2006.01)

(52) U.S. Cl.
CPC ........... *G01N 29/02* (2013.01); *G01N 29/221* (2013.01); *G01N 29/222* (2013.01); *G01N 29/223* (2013.01)

(56) References Cited

U.S. PATENT DOCUMENTS

| | | |
|---|---|---|
| 7,942,068 B2 | 5/2011 | Ao et al. |
| 8,875,587 B2 | 11/2014 | Wiest et al. |
| 9,453,749 B1 | 9/2016 | Bachmann et al. |
| 2015/0260558 A1 | 9/2015 | Priyadarshana et al. |

FOREIGN PATENT DOCUMENTS

| | | |
|---|---|---|
| EP | 1255094 A2 | 11/2002 |
| EP | 2228631 A1 | 9/2010 |
| WO | WO9719326 A1 | 5/1997 |
| WO | WO2016144585 A1 | 9/2016 |

DEVICE AND METHOD FOR ULTRASONIC FLOW MEASUREMENT

This nonprovisional application is a continuation of International Application No. PCT/EP2018/063922, which was filed on May 28, 2018, and which claims priority to EP 17177639.6, which was filed on Jun. 23, 2017, and which are both herein incorporated by reference.

BACKGROUND OF THE INVENTION

Field of the Invention

The present invention relates to a device and a method for ultrasonic flow measurement.

Description of the Background Art

Ultrasonic flowmeters find wide application in many fields of industry. In the case of ultrasonic flow measurement by the transit-time method, the difference between two acoustic signals propagating in and against the flow is measured, and the volumetric flow-rate is calculated therefrom. The measurement can be undertaken using one or more measuring paths (acoustic paths). In this connection, a measuring path is formed from two acoustic transducers which can both be operated as a transmitter and as a receiver. The mean flow velocity Vl on the acoustic path is ascertained from the difference Δt of the transit-times, from the transit-time fraction tl in the fluid, and also from a sensor constant Ka determined at the factory:

$$Vl = Ka*(\Delta t/2tl) \qquad \text{Eqn. (1)}$$

The flow-rate Q results from the path mean value Vl, from the cross-sectional area A of the tube and from the fluid-mechanics calibration factor KF as $$Q = KF*A*Vl \qquad \text{Eqn. (2)}$$

The calibration factor KF is calculated from the ratio of the path mean value Vl to the area mean value of the flow velocity VA:

$$KF = VA/Vl \qquad \text{Eqn. (3)}$$

The measurement can be undertaken in intervention-free manner, by the acoustic transducers being placed onto the tube from outside. In the case of tubes of circular cross-section, however, this measuring arrangement is restricted to diametrical measuring paths. The fluid-mechanics calibration factor KF is then greatly dependent on the Reynolds number and on the intake conditions, particularly in the laminar/turbulent transition region of the flow. In DE 19808642 C1 an arrangement with intervention-free acoustic transducers is proposed that makes a measuring effect possible that is largely independent of the flow profile. Through use of a measuring tube of pentagonal cross-section, an acoustic-path contour is achieved in which the path mean value Vl is approximately equal to the area mean value VA, so that the fluid-mechanics calibration factor KF is about KF=1, independently of the Reynolds number and the intake conditions. However, this only holds by approximation. This arrangement also displays a dependence, albeit slight, on the Reynolds number. The function of the fluid-mechanics calibration factor KF on the Reynolds number can be ascertained at the factory by calibration and can be saved in the arithmetic-logic unit of the measuring transmitter. During operation, this function can be utilized in order to correct the measured value. Since the Reynolds number depends on the viscosity, the latter has to be known during the measurement. But in the case of many media—in particular, for example, in the case of hydrocarbons—the viscosity is known only insufficiently precisely.

One possibility for measuring the Reynolds number is described in US 2015260558 A1. The Reynolds number and the viscosity are ascertained from the profile factor of a four-path arrangement. For this purpose, a symmetrical profile is firstly generated with the aid of a flow-conditioner and a reducer, in order that the profile factor depends exclusively on the Reynolds number and not on possible prior perturbations. The solution is not suitable for intervention-free measurement.

SUMMARY OF THE INVENTION

It is therefore an object of the present invention to provide a method for an accurate and intervention-free flow measurement that is independent of viscosity. Moreover, the object is to describe a device that can be used for the method.

In an exemplary embodiment, provided is a device for ultrasonic flow measurement with at least one first acoustic-transducer pair formed of one clamp-on ultrasonic transducer operating in the transmit mode and one clamp-on ultrasonic transducer operating in the receive mode. The cross-section of a measuring tube flowed through by a gaseous or liquid medium is substantially a pentagon with a base and with sides each adjoining at a right angle and also with sides adjoining the aforementioned sides and situated opposite the base, which enclose an angle of less than 180°. The first acoustic-transducer pair is arranged on the base for the purpose of generating first acoustic paths. In addition, at least one second acoustic-transducer pair is arranged, as a result of which one or more additional acoustic paths are generated. The at least second acoustic-transducer pair is arranged on one or both of the sides adjoining the base.

The device according to the invention for ultrasonic flow measurement has one acoustic-transducer pair which can be formed of one clamp-on ultrasonic transducer operating in the transmit mode and one clamp-on ultrasonic transducer operating in the receive mode. The cross-section of a measuring tube flowed through by a gaseous or liquid medium is substantially a pentagon with a base and with sides adjoining at a right angle and also with sides adjoining the aforementioned sides and situated opposite the base, which enclose an angle of less than 180°, said acoustic-transducer pair being arranged on the base for the purpose of generating a first acoustic path. A vertex situated opposite the base between the sides situated opposite the base has been flattened out and constitutes a reflector, so that the acoustic-transducer pair arranged on the base realizes the first acoustic path and a second acoustic path. The second acoustic path extends from the clamp-on ultrasonic transducer in the transmit mode via the reflector to the clamp-on ultrasonic transducer in the receive mode.

In one possible embodiment, at least one second acoustic-transducer pair is arranged on the base, situated opposite the reflector.

The method according to the invention for ultrasonic flow measurement is undertaken by using a device with an acoustic-transducer pair formed of one clamp-on ultrasonic transducer operating in the transmit mode and one clamp-on ultrasonic transducer operating in the receive mode. The cross-section of a measuring tube flowed through by a gaseous or liquid medium is substantially a pentagon with a base and with sides each adjoining at a right angle and also with sides adjoining the aforementioned sides and situated opposite the base, which enclose an angle of less than 180°. The acoustic-transducer pair is arranged on the base for the purpose of generating a first acoustic path. A vertex situated opposite the base between the sides situated opposite the base has been flattened out and constitutes a reflector, so that the acoustic-transducer pair that realizes the first acoustic path also realizes a second acoustic path. The second acoustic path extends from the clamp-on ultrasonic transducer in the transmit mode located on the base via the reflector to the clamp-on ultrasonic transducer in the receive mode located on the base.

In accordance with the invention, a function F_Re(K_VL) has been saved in the arithmetic-logic unit of the measuring transmitter, said function representing a Reynolds number as a function of the ratio K_VL of a mean first flow velocity ascertained on the first acoustic path to a mean second flow velocity ascertained on the second acoustic path.

For the first acoustic path, for one realization a function KF1(Re) has been saved which represents a ratio of an area mean value of a flow in the measuring tube to the flow velocity ascertained on the first acoustic path as a function of the Reynolds number.

For one embodiment, an algorithm has been implemented which with a function F_Re(K_VL) calculates the Reynolds number from the flow velocities ascertained on the first and second acoustic paths and hence calculates a fluid-mechanics calibration factor KF1(Re) and a flow-rate Q=KF1*A*Vl. Via a function vis=VA*Di/Re, a viscosity vis is calculated from the Reynolds number Re.

The object is also achieved by a method for ultrasonic flow measurement using a device with an acoustic-transducer pair formed of one clamp-on ultrasonic transducer operating in the transmit mode and one clamp-on ultrasonic transducer operating in the receive mode, the cross-section of a measuring tube flowed through by a gaseous or liquid medium being substantially a pentagon with a base and with sides each adjoining at a right angle and also with sides adjoining the aforementioned sides and situated opposite the base, which enclose an angle of less than 180°, the one acoustic-transducer pair being arranged on the base for the purpose of generating a first acoustic path. A vertex situated opposite the base between the sides situated opposite the base has been flattened out and constitutes a reflector, so that the acoustic-transducer pair that realizes the first acoustic path also realizes a second acoustic path. The second acoustic path extends from the clamp-on ultrasonic transducer in the transmit mode located on the base via the reflector to the clamp-on ultrasonic transducer in the receive mode located on the base.

In accordance with the invention, a function KF1(K_VL) has been saved in the arithmetic-logic unit of the measuring transducer, said function representing the fluid-mechanics calibration factor as a function of the ratio K_VL of the first flow velocity ascertained on the first acoustic path to the second flow velocity ascertained on the second acoustic path.

For an execution, an algorithm calculates with the function KF1(K_VL) the fluid-mechanics calibration factor KF1 and the flow-rate Q=KF1*A*Vl from the flow velocities ascertained on the first and second acoustic paths.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
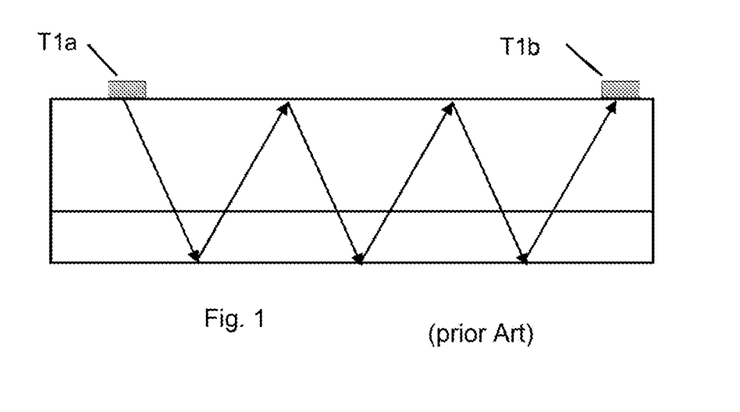
FIG. 1 is side view of the measuring tube with ultrasonic transducers and acoustic path S1 according to the prior art.

The measuring arrangement known from DE 19808642 C1, which is incorporated herein by reference, is shown in FIG. 1. The sound is coupled into the tube wall from acoustic transducer T1*a* of acoustic-transducer pair T1, passes through the tube wall and enters the fluid. After multiple reflection on the inner wall of the tube, the sound is coupled out via the tube wall and reaches acoustic transducer T1*b*.

The dimensioning of the cross-sectional shape of the measuring tube M is undertaken with the aim that the entire cross-section of the measuring tube M is acoustically irradiated uniformly and the partial acoustic paths of the individual components of the wavefront pass through, as extensively as possible, equivalent regions of the fluid. The cross-section is a pentagon in which acoustic transducers T1*a*, T1*b* have been mounted on the side designated in the following as the base 1. Sides 2 and 3 adjoining the base 1 each enclose with the latter a right angle. Sides 4 and 5 situated opposite the base 1 include an angle of less than 180°.

Figure 2:
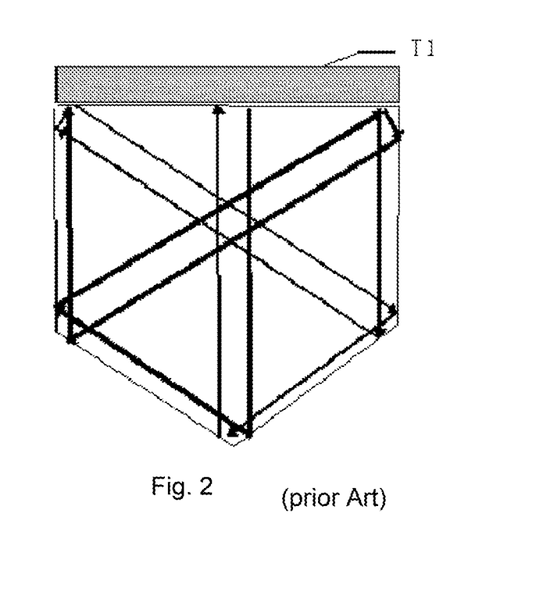
FIG. 2 is cross-section of the measuring tube in the plane of ultrasonic-transducer pair T1, and selected partial acoustic paths of acoustic path S1, projected into the plane of acoustic-transducer pair T1, according to the prior art.
Figure 3:
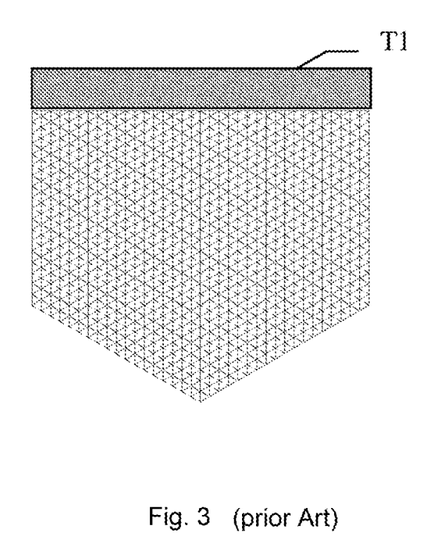
FIG. 3 is a cross-section of the measuring tube in the plane of and acoustic-transducer pair T1 and acoustic path S1 of the entire wavefront according to the prior art.

FIG. 2 shows the partial acoustic paths S1*a*, S1*b* in cross-section for two selected radiating points of acoustic-transducer pair T1. Partial acoustic path S1*a* begins at the right edge of acoustic-transducer pair T1, and partial acoustic path S1b begins at a point in the vicinity of the center of acoustic-transducer pair T1. In this connection it is assumed, in simplifying manner, that the propagation of the wavefront occurs on parallel paths. It will be discerned that both partial acoustic paths S1a, S1b pass through equivalent regions of the fluid if it is assumed that the flow profile is symmetrical. Moreover, each of the two partial acoustic paths S1a, S1b passes through both central regions and marginal regions of the flow. By approximation, this also applies to the remaining partial acoustic paths. Accordingly, on all the partial acoustic paths roughly the same measuring effect becomes effective. The overall signal results as the sum of the partial signals on the individual partial acoustic paths S1a, S1b. In the summation, the acoustic-transducer aperture function acts as a weighting factor. The acoustic-transducer aperture function describes the sensitivity distribution as a function of the location on the transducer surface. However, since the same measuring effect becomes effective on all the partial acoustic paths, in this device the acoustic-transducer aperture function has no influence on the overall measuring effect. The measuring effect, namely the change in the transit-time of sound by reason of the flow, is accordingly relatively independent of the flow profile and of the acoustic-transducer aperture function. In FIG. 3, the partial acoustic paths of the entire wavefront of acoustic-transducer pair T1 are represented. The uniform acoustic irradiation of the cross-section of the measuring tube becomes clear.

It becomes evident that the fluid-mechanics calibration factor KF of the device according to this prior art is largely, but not completely, independent of the flow profile and also of the Reynolds number. The dependence of the fluid-mechanics calibration factor KF on the Reynolds number Re on acoustic path S1 will be denoted in the following as KF1(Re).

Figure 4A:
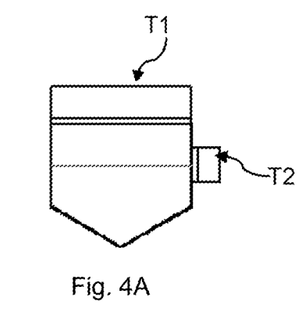
FIG. 4A is cross-section of the measuring tube in the plane of acoustic-transducer pair T2 and acoustic path S2 in reflex arrangement, projected into the plane of acoustic-transducer pair T2.
Figure 4B:
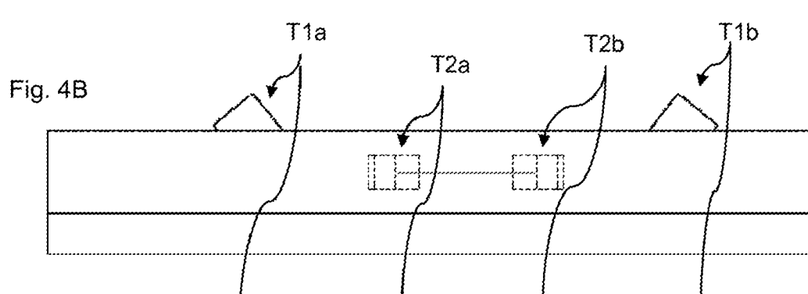
FIGS. 4B to 4D show various views.
Figure 4C:
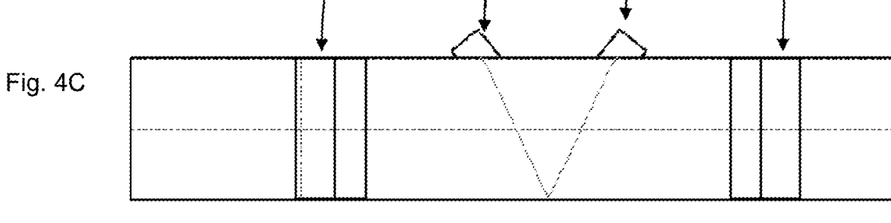
Figure 4D:
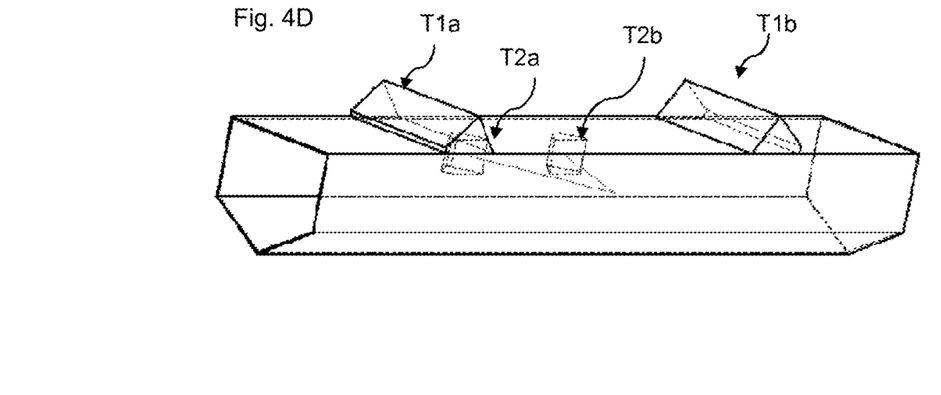
Figure 5A:
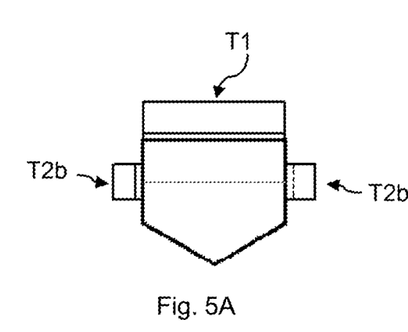
FIG. 5A is cross-section of the measuring tube in the plane of acoustic-transducer pair T2 and acoustic path S2 in direct arrangement, projected into the plane of acoustic-transducer pair T2.
Figure 5B:
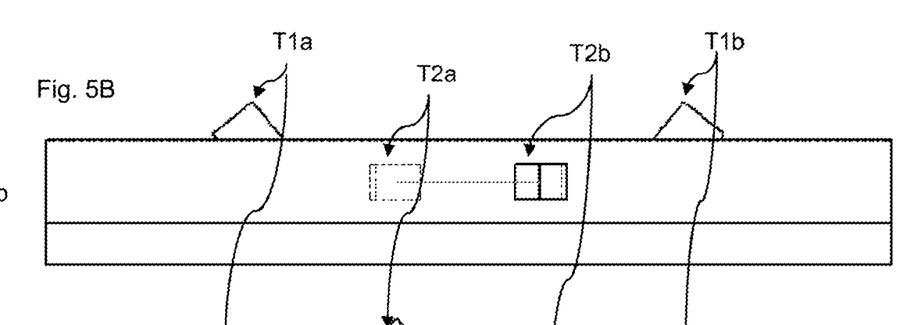
FIGS. 5B to 5D show various views.
Figure 5C:
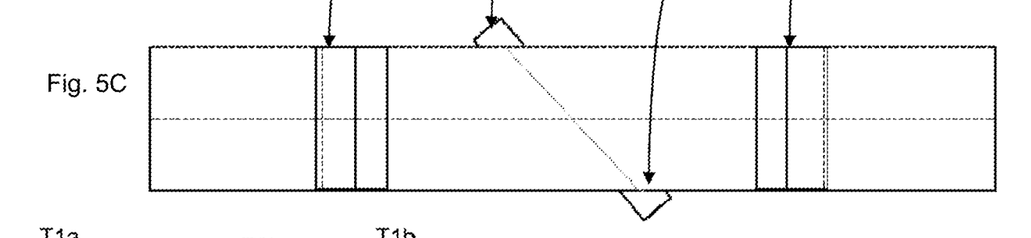
Figure 5D:
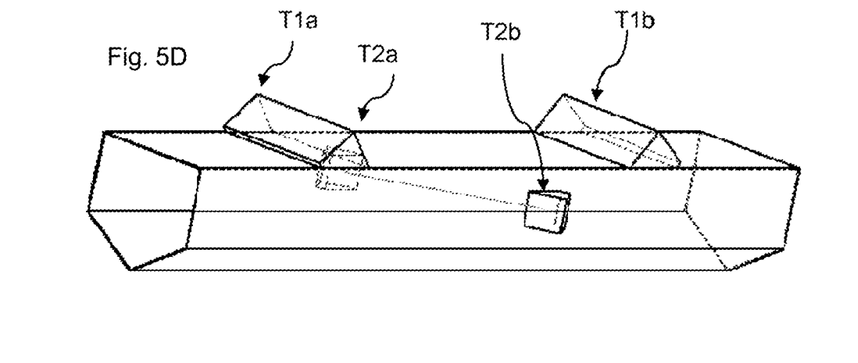

FIGS. 4A to 4D and 5A to 5D show a solution in respect of a cross-section of the measuring tube M in the plane of acoustic-transducer pair T2. In addition to acoustic-transducer pair T1 arranged on the base 1, a further acoustic-transducer pair T2 has been mounted on of the adjoining sides 2 or 3 or on both. In FIG. 4A, the cross-section of the measuring tube M is represented in the plane of acoustic-transducer pair T2, formed of acoustic transducers T2a and T2b, and acoustic path S2 is represented in reflex arrangement, projected into the plane of acoustic-transducer pair T2. In this case, acoustic path S2 extends from acoustic transducer T2a to the opposite side and reaches acoustic transducer T2b after reflection on the inner wall of the tube. A further possibility for realizing an acoustic path S2 is represented in FIG. 5, where the cross-section of the measuring tube in the plane of acoustic-transducer pair T2 with the two acoustic transducers T2a and T2b, which are arranged on the two sides 2, 3 adjoining the base 1, and with acoustic path S2 is to be seen in direct arrangement, projected into the plane of acoustic-transducer pair T2. As a result, in addition to acoustic path S1 a further acoustic path S2 is realized. The acoustic paths S2 realized in this way cover only a part of the flow profile. In contrast to the calibration factor effective on acoustic path S1, the fluid-mechanics calibration factor KF2(Re) that is effective on these acoustic paths is greatly dependent on the Reynolds number Re, particularly in the transition region between laminar and turbulent flow.

The arrangement according to the invention with the two acoustic paths S1 and S2 is capable of correcting the Reynolds-number dependence remaining on acoustic path S1. For this purpose, in a measuring transducer the relationship between the calibration factor KF1 and the ratio K_VL of the mean flow velocities VL1, VL2 (mean flow velocity VL on the acoustic path corresponds to the path velocity) measured with the two acoustic paths S1, S2 is saved in the arithmetic-logic unit of the measuring transducer. This can be done in the form of a table of pairs of values. It is more favorable to approximate the relationship with a function KF1(K_VL).

The mean first flow velocity VL1 ascertained on the first acoustic path S1 represents approximately an area mean value of the flow profile and is therefore largely independent of the Reynolds number Re and of profile asymmetries. By way of second acoustic path S2, use is preferentially made of a central measuring path. The latter is influenced far less than decentralized measuring paths by profile asymmetries. Therefore the arrangement does not need a symmetrical profile at the entrance of the measuring tube.

The fluid-mechanics calibration factor KF1 is approximated from the ratio K_VL of the mean flow velocities VL1, VL2 ascertained on the first and second acoustic paths S1, S2.

$$K\_VL = VL1/VL2 \qquad \text{Eqn. (4)}$$

For this purpose, the relationship between the fluid-mechanics calibration factor KF1 and the ratio K_VL is saved in the measuring transducer, either as a table of pairs of values or with a function KF1(K_VL).

In addition, the Reynolds number Re can be determined from the ratio K_VL. For this purpose, the relationship between the Reynolds number Re and the ratio K_VL is saved in the measuring transducer, either as a table of pairs of values or with a function Re(K_VL).

From the Reynolds number Re, the viscosity vis can also be calculated via the relation $$\text{vis} = VA * Di/Re \qquad \text{Eqn. (5)}$$

In this relation, Di is the equivalent inside diameter of the measuring tube, which is calculated from the cross-section A of the measuring tube. Di=root(4*A/Pi)

Figure 6:
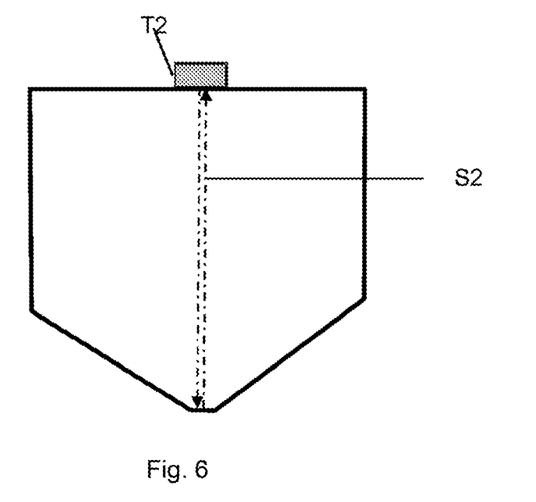
FIG. 6 is a cross-section of the measuring tube in the plane of acoustic transducer pair T2 and acoustic path S2 in reflex arrangement with acoustic-transducer arrangement on the base, projected into the plane of acoustic-transducer pair T2.

In FIG. 6 a further advantageous possibility for realizing acoustic path S2 is shown. For this purpose, the vertex situated opposite the base 1 between sides 4, 5 situated opposite the base 1 has been designed to be flattened out and constitutes a reflector 6. An acoustic-transducer pair T2 mounted on the base 1 of the measuring tube M transmits the sound from the base 1 to the reflector 6 and back to the base 1.

Figure 7:
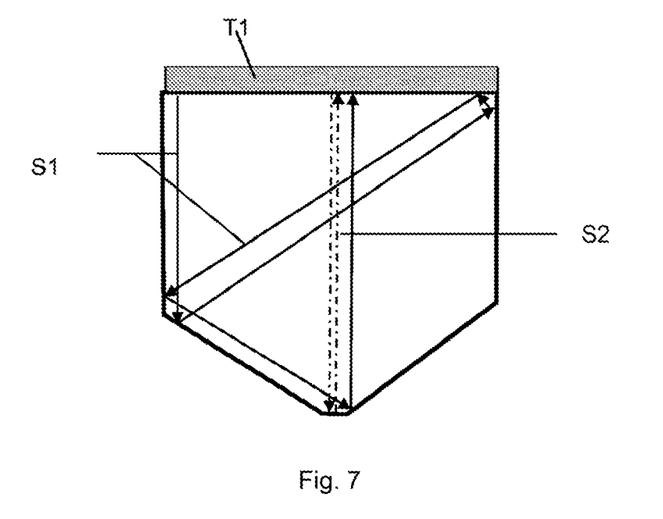
FIG. 7 is a cross-section of the measuring tube in the plane of acoustic-transducer pair T1 and acoustic path S2 in reflex arrangement, wherein acoustic-transducer pair T1 generates both acoustic path S1 and acoustic path S2, projected into the plane of acoustic transducer pair T2.

An arrangement according to FIG. 7 is particularly simple and correspondingly inexpensive. The vertex situated opposite the base 1 between sides 4, 5 situated opposite the base 1 has been designed to be flattened out and constitutes the reflector 6. Acoustic-transducer pair T1 mounted on the base 1 of the measuring tube M transmits the sound from the base 1 to the reflector 6 and back to the base 1. Acoustic-transducer pair T1 realizes the first acoustic path S1 which extends correspondingly in the measuring tube which is pentagonal in cross-section. A second acoustic path S2 extends between the clamp-on ultrasonic transducer in the transmit mode on the base 1 via the reflector 6 to the clamp-on ultrasonic transducer in the receive mode on the base 1. One part of the sound transmitted by acoustic-transducer pair T1 proceeds on acoustic path S1, whereas a smaller part proceeds on acoustic path S2. The signal on acoustic path S2 reaches the receiving transducer distinctly earlier than the signal on acoustic path S1, on account of the shorter acoustic-path length, so the two signals can be distinguished from one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for ultrasonic flow measurement, the device comprising:
   an acoustic-transducer pair that has at least one clamp-on ultrasonic transducer operating in a transmit mode and at least one clamp-on ultrasonic transducer operating in a receive mode,
   wherein a cross-section of a measuring tube flowed through by a gaseous or liquid medium is substantially a pentagon with a base and with sides each adjoining at a right angle and with sides adjoining the aforementioned sides and situated opposite the base, which enclose an angle of less than 180°,
   wherein the acoustic-transducer pair is arranged on the base to generate a first acoustic path, and
   wherein a vertex situated opposite the base between the sides situated opposite the base has been flattened out and constitutes a reflector so that the acoustic-transducer pair arranged on the base realizes the first acoustic path and a second acoustic path that extends from the clamp-on ultrasonic transducer in the transmit mode via the reflector to the clamp-on ultrasonic transducer in the receive mode.

2. A method for ultrasonic flow measurement using a device with an acoustic-transducer pair having a first clamp-on ultrasonic transducer operating in the transmit mode and a second clamp-on ultrasonic transducer operating in the receive mode, wherein a cross-section of a measuring tube flowed through by a gaseous or liquid medium is substantially a pentagon with a base and with sides each adjoining at a right angle and with sides adjoining the aforementioned sides and situated opposite the base, which enclose an angle of less than 180°, wherein the acoustic-transducer pair is arranged on the base for the purpose of generating a first acoustic path, wherein a second acoustic path is realized which extends from the clamp-on ultrasonic transducer in the transmit mode located on the base via a reflector, which is constituted by a flattened-out vertex situated opposite the base to the clamp-on ultrasonic transducer in the receive mode located on the base, the method comprising:
   ascertaining a first flow velocity on the first acoustic path;
   ascertaining a second flow velocity on the second acoustic path;
   saving a function in an arithmetic-logic unit of the device, the function representing a Reynolds number as a function of a ratio of a mean first flow velocity ascertained on the first acoustic path to a mean second flow velocity ascertained on the second acoustic path.

3. The method as claimed in claim 2, wherein, for the first acoustic path, a function is saved that represents a ratio of an area mean value of a flow in the measuring tube to the first flow velocity ascertained on the first acoustic path as a function of the Reynolds number.

4. The method as claimed in claim 3, wherein an algorithm is implemented which with a function calculates the Reynolds number from the flow velocities ascertained on the first and second acoustic paths and calculates a fluid-mechanics calibration factor and a flow-rate from $Q=KF1*A*VI$.

5. The method as claimed in claim 2, wherein a viscosity is calculated from the Reynolds number via a function $vis=VA*Di/Re$.

6. A method for ultrasonic flow measurement using a device with an acoustic-transducer pair that has a first clamp-on ultrasonic transducer operating in the transmit mode and a second clamp-on ultrasonic transducer operating in the receive mode, wherein the cross-section of a measuring tube flowed through by a gaseous or liquid medium is substantially a pentagon with a base and with sides each adjoining at a right angle and also with sides adjoining the aforementioned sides and situated opposite the base, which enclose an angle of less than 180°, the method comprising:
   arranging the acoustic-transducer pair on the base to generate a first acoustic path;
   realizing a second acoustic path that extends from the clamp-on ultrasonic transducer in the transmit mode located on the base via a reflector, which is constituted by a flattened-out vertex situated opposite the base to the clamp-on ultrasonic transducer in the receive mode located on the base; and
   saving a function in an arithmetic-logic unit of the device, the function representing a fluid-mechanics calibration factor as a function of a ratio of a first flow velocity ascertained on the first acoustic path to a second flow velocity ascertained on the second acoustic path.

7. The method as claimed in claim 6, wherein an algorithm calculates with the function the fluid-mechanics calibration factor from the flow velocities ascertained on the first and second acoustic paths, and calculates the flow-rate as $Q=KF1*A*VI$.

* * * * *